United States Patent Office 3,501,043
Patented Mar. 17, 1970

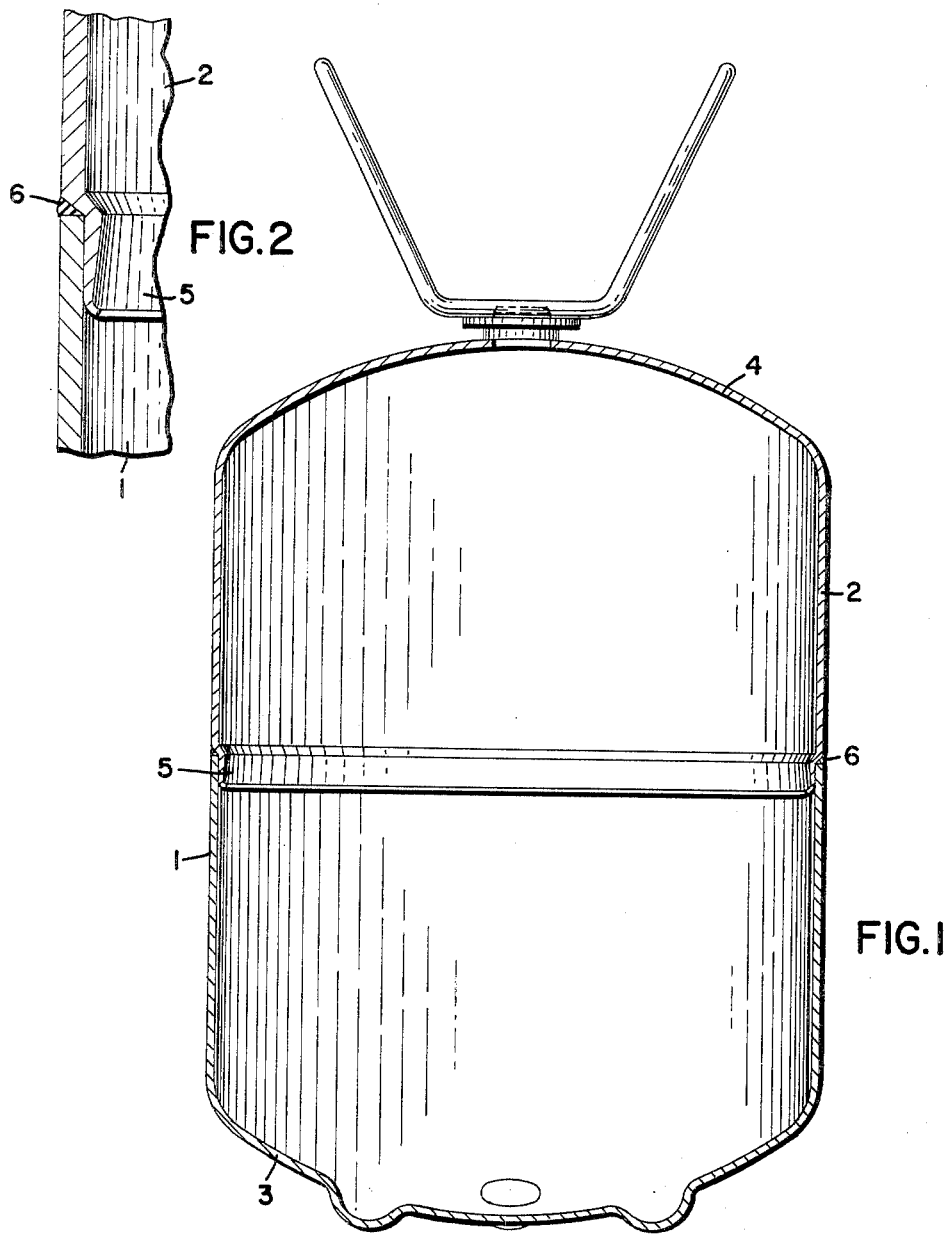

---

3,501,043
HIGH PRESSURE VESSEL
Robert H. Jernberg, Worcester, Mass., assignor to Worcester Pressed Steel Company, Worcester, Mass., a corporation of Massachusetts
Continuation of application Ser. No. 712,133, Mar. 11, 1968. This application Apr. 23, 1969, Ser. No. 818,846
Int. Cl. B65d 7/04
U.S. Cl. 220—5       4 Claims

ABSTRACT OF THE DISCLOSURE

A cylindrical steel vessel with closed ends for holding fluids under high pressure comprising two cylindrical halves of circular cross section assembled and welded to each other in end-to-end telescopic abutment, the two halves having the same inside and outside diameters in the immediate neighborhood of their junction, one of said halves terminating abruptly at the junction while the other half is formed integral with a tapered peripheral flange adapted to fit telescopically inside the adjacent end of the other half, the abutting ends being welded to each other on the outside of the vessel, the steel at the ends of the vessel being softer than the steel in the cylindrical portions.

---

This application is a continuation of Ser. No. 712,133 filed Mar. 11, 1968, now abandoned.

BACKGROUND OF THE INVENTION

In the fabrication of pressure vessels, it is common practice to form the vessel in two halves which are subsequently welded together. This welding operation made it necessary to anneal the steel so that it was not as strong. Therefore, it has always been necessary to form the two halves from very thick sheet metal which is capable of withstanding the internal gas pressure even after being annealed after the welding operation. The resultant vessel has been expensive and heavy for that reason. These and other difficulties experienced with the prior art devices have been obviated in a novel manner by the present invention.

It is, therefore, an outstanding object of the invention to provide a pressure vessel which is inexpensive and light weight.

Another object of this invention is the provision of a pressure vessel capable of withstanding substantial pressures even though it is fabricated from thin sheet steel.

A further object of the present invention is the provision of a pressure vessel having ends that are soft to permit relatively safe pressure release if the pressure of the contents increases accidentally.

It is another object of the instant invention to provide a pressure vessel made of two cup-shaped steel elements welded together, wherein a subsequent annealing operation is not necessary.

SUMMARY OF THE INIVENTION

The invention relates to a cylindrical vessel of low carbon steel to permit the two halves to be made by deep drawing the steel and, after providing a tapered rolled form lead on one of the ends, telescoping the lead into the other half and welding the two halves together from the outside of the vessel. The cylindrical portions will then be of harder steel than the end portions because of the deep drawing to which they have been subjected so that, if the ends are initially of slightly elliptical form, they will tend to assume the spherical form when the vessel is filled with fluid under excessive pressure, without any appreciable increase in diameter of the cylindrical portions.

BRIEF DESCRIPTION OF THE DRAWINGS

The character of the invention, however, may be best understood by reference to one of its structural forms, as illustrated by the accompanying drawings, in which:

FIG. 1 is a view of the entire vessel in longitudinal section; and

FIG. 2 is an enlarged fragmentary view of the region of the junction in longitudinal section.

DESCRIPTION OF THE PREFERRED EMBODIMENT

The vessel consists essentially of two cylindrical halves 1 and 2 with integral dished ellipsoidal ends 3 and 4, respectively. The vessel is formed of soft steel with not more than 0.05% carbon and the cylindrical halves are made by deep drawing. This 0.05% carbon steel have been subjected during formation to a de-oxidizing step, such as by the addition of aluminum to the charge. Therefore, the cylindrical side portions will be somewhat harder than the end portions. If the welding is performed quickly by improved methods, then the cylindrical portions in the neighborhood of the weld will not be heated to such an extent as to cause the cylindrical side portions to become annealed again.

After the deep drawing operation is finished, one of the cylindrical halves 2 is subjected to a peripheral rolling operation to form a tapered cylindrical skirt 5 adapted to fit inside the free edge of the other cylindrical half 2. The free edge of the skirt is of a thickness much less than the wall thickness of the cylindrical side portions to give it sufficient flexibility to permit easy assembling of the cylindrical halves in end-to-end relation. After they are thus assembled, they are provided with a narrow weld 6 as quickly as possible to avoid heating the neighboring parts of the cylindrical portions any more than necessary.

It can be seen, then, that the present invention relates to a pressure vessel incorporating new principles; basically, these principles have to do with:

(1) The use of modern deep-drawing steel with a low carbon content to give a stable stress pattern in the sides.

(2) A natural work hardening of the sides of the steel half as it is fabricated into a cup shape.

(3) The use of modern welding techniques with a very narrow heat-affected zone. The combination of these three principles in a pressure vessel gives a unique product. The use of very low carbon content steel combined with the welding technique and work hardening due to the drawing operations achieves tensile properties approaching 75,000 p.s.i. At the same time, the low carbon content guarantees a ductility equal to a 180° flattening bend test. The modern welding technique preserves this hardness and strength in all the essential areas of the pressure vessel. If the gas pressure in the vessel increases due to misuse, etc., the soft ends allow the ellipsoidal ends to expand into hemispheres. This allowance for expansion is a safety feature since, after assuming a hemispherical shape, the unit pressure drops to one-half of the unit pressure on the side wall and eventual bursting occurs in the higher-strength wall. The high strength of the side wall has an additional advantage in that it is not subject to being easily dented during transportation and use. Such dents are not only unaesthetic but also carry elements of danger because of high concentration stress at sharp angles formed therein.

It is obvious that minor changes may be made in the form and construction of the invention without departing from the material spirit thereof.

The invention having been thus described, what is claimed as new and desired to secure by Letters Patent is:

1. A pressure vessel with a cylindrical body and integral convex ends for holding materials under pressure, said body being formed of two cylindrical halves formed of 0.05% or less carbon steel deep drawn so that the cylindrical portions are work-hardened, but the ends remain relatively soft, the halves being fitted together at their adjacent edges and having substantially the same inside and outside diameters in the neighborhood of the junction, one of said halves terminating abruptly at the end of the cylindrical portion while the other half is formed with a skirt as an extension of the cylindrical portion, said skirt having an outside diameter substantially equal to but not greater than the internal diameter of the cylindrical portions, and a peripheral weld around the outside of the container joining the cylindrical halves integrally to each other circumferentially of the container.

2. A vessel as recited in claim 1, wherein the said skirt is tapered to a thickness much less than the wall thickness of the cylindrical portion.

3. A vessel as recited in claim 1, wherein the said ends are ellipsoidal in form.

4. A pressure vessel with a cylindrical body and integral convex ends for holding materials under pressure, said body being formed of two cylindrical halves formed of low carbon steel deep drawn so that the cylindrical portions are work-hardened, but the ends remain relatively soft, the halves being fitted together at their adjacent edges and having substantially the same inside and outside diameters in the neighborhood of the junction, one of said halves terminating abruptly at the end of the cylindrical portion while the other half is formed with a skirt as an extension of the cylindrical portion, said skirt having an outside diameter substantially equal to but not greater than the internal diameter of the cylindrical portions, and a peripheral weld around the outside of the container joining the cylindrical halves integrally to each other circumferentially of the container.

References Cited

UNITED STATES PATENTS 1,944,527   1/1934   Pfaendler.
2,551,484   5/1951   Branning _____ 220—5

GEORGE E. LOWRANCE, Primary Examiner